US008686108B2

(12) United States Patent
Kamiya (10) Patent No.: US 8,686,108 B2
(45) Date of Patent: Apr. 1, 2014

(54) ALUMINUM CHELATE LATENT CURING AGENT AND PRODUCTION METHOD THEREOF

(75) Inventor: Kazunobu Kamiya, Tochigi (JP)

(73) Assignee: Sony Chemical & Information Device Corporation, Tokyo (JP)

(*) Notice: Subject to any disclaimer, the term of this patent is extended or adjusted under 35 U.S.C. 154(b) by 237 days.

(21) Appl. No.: 13/125,515

(22) PCT Filed: Jul. 5, 2010

(86) PCT No.: PCT/JP2010/061419
§ 371 (c)(1),
(2), (4) Date: Apr. 21, 2011

(87) PCT Pub. No.: WO2011/010549
PCT Pub. Date: Jan. 27, 2011

(65) Prior Publication Data
US 2011/0196110 A1   Aug. 11, 2011

(30) Foreign Application Priority Data
Jul. 24, 2009   (JP) .................................. 2009-173359

(51) Int. Cl.
C08G 59/68 (2006.01)
B32B 5/12 (2006.01)
C08F 283/00 (2006.01)
C08G 59/14 (2006.01)
C08L 63/00 (2006.01)

(52) U.S. Cl.
USPC ............ 528/408; 428/114; 428/221; 525/523

(58) Field of Classification Search
USPC ....................................................... 525/528
See application file for complete search history.

(56) References Cited

U.S. PATENT DOCUMENTS 3,726,804 A * 4/1973 Matsukawa et al. ........... 264/4.7
5,336,581 A * 8/1994 Inaba et al. ................ 430/110.2
(Continued)

FOREIGN PATENT DOCUMENTS

CN   1856521 A   11/2006
CN   101925628 A   12/2010
(Continued)

OTHER PUBLICATIONS

Igarashi et al., Computer generated English translation of JP 05-132650 A, May 28, 1993.*
(Continued)

Primary Examiner — Peter F Godenschwager
Assistant Examiner — David Karst
(74) Attorney, Agent, or Firm — Oliff PLC

(57) ABSTRACT

An aluminum chelate latent curing agent is configured such that an aluminum chelating agent and a specific arylsilane compound or a hydrolysate thereof are held in a polymer obtained by subjecting the aluminum chelating agent, the arylsilane compound, and a polyfunctional isocyanate compound to an emulsifying treatment, and then subjecting the polyfunctional isocyanate to interfacial polymerization. The aluminum chelating agent does not have an alkoxy group bonded to the aluminum. The arylsilane compound is a compound represented by the formula (A).

$$(Ar)_m Si(OR)_n \qquad (A)$$

In the formula (A), m is 2 or 3, and the sum of m and n is 4. Ar represents an optionally-substituted aryl group. R represents a hydrogen atom, a methyl group, or an ethyl group. When n is two, the two Rs may be the same or different.

12 Claims, 9 Drawing Sheets

(56) References Cited

U.S. PATENT DOCUMENTS

| | | | |
|---|---|---|---|
| 6,924,008 B2 * | 8/2005 | Takai et al. | 428/1.1 |
| 8,198,342 B2 | 6/2012 | Kamiya | |
| 8,349,973 B2 | 1/2013 | Kamiya | |
| 2007/0010636 A1 | 1/2007 | Kamiya et al. | |
| 2008/0319110 A1 * | 12/2008 | Kamiya et al. | 524/356 |
| 2009/0275708 A1 | 11/2009 | Kamiya | |
| 2010/0324170 A1 * | 12/2010 | Kamiya | 523/206 |

FOREIGN PATENT DOCUMENTS

| | | | | |
|---|---|---|---|---|
| CN | 102292373 A | | 12/2011 | |
| JP | A-62-227923 | | 10/1987 | |
| JP | 05132650 A | * | 5/1993 | ........... C09D 163/00 |
| JP | A-2002-212537 | | 7/2002 | |
| JP | A-2006-070051 | | 3/2006 | |
| JP | A-2006-241320 | | 9/2006 | |
| JP | A-2006-328188 | | 12/2006 | |
| WO | WO 2005/033173 A1 | | 4/2005 | |
| WO | WO 2007/007725 A1 | | 1/2007 | |
| WO | WO 2009028224 A1 * | | 3/2009 | ............. C08L 63/00 |

OTHER PUBLICATIONS

International Search Report issued in PCT/JP2010/061419, dated Sep. 14, 2010.

Feb. 5, 2013 Office Action issued in Chinese Patent Application No. 201080034675.8 (with English translation).

Aug. 14, 2013 Second Office Action issued in Chinese Application No. 201080034675.8 with English-language translation.

* cited by examiner

ALUMINUM CHELATE LATENT CURING AGENT AND PRODUCTION METHOD THEREOF

TECHNICAL FIELD

The present invention relates to an aluminum chelate latent curing agent which is useful as a low-temperature fast-curing curing agent for an epoxy resin.

BACKGROUND ART

As a curing agent exhibiting low-temperature fast-curing activity for an epoxy resin, a micro-encapsulated aluminum chelate latent curing agent has previously been proposed in which an aluminum chelating agent is held in a porous resin obtained by subjecting a polyfunctional isocyanate compound to interfacial polymerization (Patent Document 1). Furthermore, a thermosetting epoxy resin composition in which a silane coupling agent, which has a polymerizable group such as a vinyl group and a trialkoxy group that acts as a hydrolyzable group to form a hydroxyl group by hydrolysis, and an epoxy resin are blended in this aluminum chelate latent curing agent, has excellent storage stability, despite it being a one-component type. In addition, such a thermosetting epoxy resin composition has the property of low-temperature fast curing by cationic polymerization (in the same Patent Document).

PRIOR ART DOCUMENTS

Patent Documents

[Patent Document 1] Japanese Patent Application Laid-Open No. 2006-70051

SUMMARY OF THE INVENTION

Problems to be Solved by the Invention

However, for the thermosetting epoxy resin composition described in Patent Document 1, which is formed by blending an aluminum chelate latent curing agent, a silane coupling agent, and an epoxy resin, there is the problem that to realize sufficient latency a large amount of a polyfunctional isocyanate compound has to be used as a capsule wall material. Consequently, the amount of aluminum chelate agent directly involved in the curing of the epoxy resin is relatively lower, which makes it more difficult to realize low-temperature fast-curing properties. Furthermore, the particle size of the latent curing agent increases, so that unreacted isocyanate compound is present within the curing agent particles. This unreacted isocyanate compound may have a bad influence upon the cured epoxy resin.

Furthermore, when producing a thermosetting epoxy resin composition from an aluminum chelate latent curing agent, a silane coupling agent, and an epoxy resin, a step of dissolving or dispersing the silane coupling agent in the epoxy resin in advance is necessary. To reduce production costs, it has been required to omit this step of dissolving or dispersing. Moreover, since the silane coupling agent is directly mixed into the thermosetting epoxy resin composition, the use of epoxy resins having a functional group which causes an unintentional reaction therewith or the like resin is restricted. Therefore, there is a need for an organic silane compound having a hydroxyl group or a hydrolyzable group that can be used in a thermosetting epoxy resin composition containing an aluminum chelate latent curing agent instead of such a silane coupling agent.

If an aluminum chelating agent and such an organic silane compound can be formed into a fine powder having a uniform size in a state in which both are present, a step to resolving the above problems would be to open up a way to provide a low-temperature fast-curing curing agent that simultaneously also has latency by microencapsulating this fine powder with an interfacial polymer composed of a small amount of a polyfunctional isocyanate compound. However, there have been no reports of the formation of a fine powder having both the aluminum chelating agent and such an organic silane compound.

The present invention is directed to resolving the above-described problems in the conventional art. It is an object of the present invention to enable an aluminum chelating agent and an organic silane compound having a hydroxyl group or a hydrolyzable group to form a fine powder having a uniform size in a state in which both are present. Further, it is also an object of the present invention to provide an aluminum chelate latent curing agent in the form of fine particles having low-temperature fast-curing properties utilizing this powder.

Means for Solving the Problems

The present inventor researched the use of specific arylsilane compounds having a hydroxyl group or a hydrolyzable group and having a chemical structure with high steric hindrance to promote cationic catalyst formation for an aluminum chelate latent curing agent. As a result, the present inventor discovered that, surprisingly, the above objectives could be achieved due to the following facts: that during interfacial polymerization of a polyfunctional isocyanate compound, reactivity with the isocyanate group is low; that an aluminum chelating agent which does not have an alkoxy group directly bonded to the aluminum is not easily hydrolyzed, and thus can be subjected to an emulsion treatment; that when the polyfunctional isocyanate compound is subjected to interfacial polymerization in the presence of these emulsions, the aluminum chelating agent and the specific arylsilane compound are held in the interfacial polymerization product (i.e., polyurea-urethane resin wall) even if the used amount of the polyfunctional isocyanate compound is comparatively less than in the conventional art; and yet that the specific arylsilane compound held in this interfacial polymerization product surprisingly suppresses a polymerization termination reaction, and forms a cationic active species with the aluminum chelating agent. Based on these discoveries, the present inventor completed the present invention.

More specifically, the present invention provides, as an aluminum chelate latent curing agent which is formed from microencapsulated fine particles that exhibit latency, an aluminum chelate latent curing agent in which an aluminum chelating agent and an arylsilane compound or a hydrolysate thereof are held in a polymer obtained by subjecting the aluminum chelating agent, the arylsilane compound, and a polyfunctional isocyanate compound to an emulsifying treatment, and then subjecting the polyfunctional isocyanate to interfacial polymerization, wherein the aluminum chelating agent does not have an alkoxy group bonded to the aluminum, and the arylsilane compound is represented by the formula (A).

$$(Ar)_m Si(OR)_n \tag{A}$$

In the formula (A), m is 2 or 3, and the sum of m and n is 4. Ar represents an optionally-substituted aryl group. R represents a hydrogen atom, a methyl group, or an ethyl group. When n is 2, the two Rs may be the same or different. Here, if R is a hydrogen atom, the arylsilane compound of the formula (A) is an arylsilanol compound. If R is methyl or ethyl, the arylsilane compound of the formula (A) is a compound in which, during the emulsifying treatment or interfacial polymerization, the OR group is hydrolyzed into an OH group, so that the compound becomes ultimately an arylsilanol compound.

Furthermore, the present invention provides a method for producing the above-described aluminum chelate latent curing agent, characterized by: obtaining an oil phase by dissolving or dispersing an aluminum chelating agent that does not have an alkoxy group bonded to the aluminum, an arylsilane compound of the above formula (A), and a polyfunctional isocyanate compound in an organic solvent; obtaining an emulsion by charging and emulsifying the oil phase into an aqueous phase including a dispersant; and heating the obtained emulsion to cause the polyfunctional isocyanate compound to undergo interfacial polymerization, whereby a polymer is obtained in which the aluminum chelating agent and the arylsilane compound or a hydrolysate thereof are held.

The present invention also provides a thermosetting epoxy resin composition, which includes the aluminum chelate latent curing agent according to the present invention and an epoxy resin.

Advantages of the Invention

In the aluminum chelate latent curing agent according to the present invention, an aluminum chelating agent, a specific arylsilane compound having a hydroxyl group or a hydrolyzable group and having a chemical structure with high steric hindrance, and a polyfunctional isocyanate are formed into fine particles by an emulsifying treatment without harming the activity thereof. Consequently, a polymerization termination reaction can be suppressed, and a cationic active species can be formed with the aluminum chelating agent. Furthermore, an epoxy resin and the like having a functional group that reacts with typical silanol compounds can also be used. Therefore, in a thermosetting epoxy resin composition including the aluminum chelate latent curing agent according to the present invention, a glycidyl ether epoxy resin added as the epoxy resin can be quickly cured at a low temperature. In particular, in the aluminum chelate latent curing agent, since the aluminum chelating agent and the specific arylsilane compound are protected by a polyurea-urethane resin wall, when producing the thermosetting epoxy resin composition, a step for dissolving or dispersing the specific arylsilane compound in an epoxy resin in advance becomes unnecessary.

BRIEF DESCRIPTION OF THE DRAWINGS

FIG. 76 is an electron micrograph (5,000 times magnification) of the aluminum chelate latent curing agent of Example 3.

EMBODIMENTS FOR CARRYING OUT THE INVENTION

The aluminum chelate latent curing agent according to the present invention is an aluminum chelate latent curing agent in which an aluminum chelating agent and a specific arylsilane compound or a hydrolysate thereof are held in a polymer obtained by subjecting the aluminum chelating agent, the arylsilane compound, and a polyfunctional isocyanate compound to an emulsifying treatment, and then subjecting the polyfunctional isocyanate to interfacial polymerization. In this aluminum chelate latent curing agent, a polyurea-urethane resin wall (microcapsule wall) having excellent thermal responsiveness is formed by the interfacial polymerization of the polyfunctional isocyanate, which protects the aluminum chelating agent and the arylsilane compound or a hydrolysate thereof. Here, the aluminum chelating agent does not have an alkoxy group bonded to the aluminum. Furthermore, the arylsilane compound is a compound represented by the formula (A).

(A)

In the formula (A), m is 2 or 3, and the sum of m and n is 4. Ar represents an optionally-substituted aryl group. R represents a hydrogen atom, a methyl group, or an ethyl group. When n is two, the two Rs may be the same or different. Here, if R is a hydrogen atom, the arylsilane compound of the formula (A) is an arylsilanol compound. If R is methyl or ethyl, the arylsilane compound of the formula (A) is a compound in which, during the emulsifying treatment or interfacial polymerization, the OR group is hydrolyzed into an OH group, so that the compound is ultimately an arylsilanol compound.

"Ar" is an optionally-substituted aryl group. Examples of the aryl group include a phenyl group, a naphthyl group (for example, a 1- or 2-naphthyl group), an anthracenyl group (for example, a 1-, 2-, or 9-anthracenyl group, or a benz[a]-9-anthracenyl group), a phenaryl group (for example, a 3- or 9-phenaryl group), a pyrenyl group (for example, a 1-pyrenyl group), an azulenyl group, a fluorenyl group, a biphenyl group (for example, a 2-, 3-, or 4-biphenyl group), a thienyl group, a furyl group, a pyrrolyl group, an imidazolyl group, and a pyridyl group. Of these, from the perspectives of ease of acquisition and acquisition cost, a phenyl group is preferred. The m number of Ar(s) may be the same or different. However, from the perspective of ease of acquisition, it is preferred that the Ar(s) are the same.

These aryl groups can have 1 to 3 substituents. Examples of such substituents include: a halogen such as chloro and bromo; trifluoromethyl; nitro; sulfa; an alkoxy carbonyl such as carboxyl, methoxycarbonyl, and ethoxycarbonyl; an electron withdrawing group such as formyl; an alkyl such as methyl, ethyl, and propyl; an alkoxy such as methoxy and ethoxy; hydroxy; amino; a monoalkylamino such as monomethylamino; and an electron donating group such as a dialkylamino like dimethylamino. If the arylsilane compound has a hydroxyl group (R=H) as a result of using an electron withdrawing group as a substituent, or if the arylsilane compound has a hydroxyl group due to a methoxy group (R=methyl group) or an ethoxy group (R=ethyl group) that it had being hydrolyzed, the acidity of that hydroxyl group can be increased. Conversely, if an electron donating group is used, since acidity decreases, the curing activity can be controlled. Here, although the substituents may differ for each of the m number of Ar(s), from the perspective of ease of acquisition, it is preferred that substituents for the m number of Ar(s) be the same. Furthermore, some of the Ar(s) may have a substituent, while the other Ar(s) do not. Specific examples of a phenyl group having a substituent include a 2-, 3- or 4-methyl phenyl group; a 2,6-dimethyl-, 3,5-dimethyl-, 2,4-dimethyl-, 2,3-dimethyl-, 2,5-dimethyl-, or 3,4-dimethyl phenyl group; a 2,4,6-trimethyl phenyl group; and a 2- or 4-ethyl phenyl group.

Among the arylsilane compounds of the formula (A), preferred examples include triphenylsilanol, diphenylsilanediol, triphenylmethoxysilane, and triphenylethoxysilane. Especially preferred is triphenylsilanol.

The aluminum chelate latent curing agent according to the present invention has a shape from anything from a spherical shape to an irregular particle shape, because it is produced by utilizing an emulsifying treatment and then an interfacial polymerization method. From the perspectives of curing properties and dispersibility, the aluminum chelate latent curing agent preferably has an average particle size of 0.1 to 30 μm.

From the perspective of curing stability, it is preferred that the aluminum chelate latent curing agent essentially should not include the organic solvent used during the emulsifying treatment thereof. Specifically, it is preferred that the aluminum chelate latent curing agent include the organic solvent at an amount of 1 ppm or less.

In the aluminum chelate latent curing agent according to the present invention, the specific arylsilane compound is protected by a polyurea-urethane resin wall (microcapsule wall). This specific arylsilane compound is either a compound in which R is a hydrogen atom, or if R is methyl or ethyl, a compound in which R has become a hydrogen atom due to hydrolysis of the OR group (methoxy group or ethoxy group), specifically, is an arylsilanol having a chemical structure represented by the following formula (B).

(B)

In the formula (B), m is 2 or 3, preferably 3, and the sum of m and n is 4. Therefore, the arylsilanol of the formula (B) is a monool or diol compound. "Ar" is as described for the arylsilane compound of the formula (A).

Since the arylsilanol of the formula (B) is derived from the arylsilane compound of the formula (A), similar to the arylsilane compound of the formula (A), preferred examples of the arylsilanol of formula (B) include triphenylsilanol and diphenylsilanediol. In particular, preferred is triphenylsilanol.

Examples of the aluminum chelating agent constituting the aluminum chelate latent curing agent according to the present invention include complex compounds in which three β-ketoenolate anions are coordinated to aluminum as shown in the following formula (1). Here, the alkoxy group is not directly bonded to the aluminum. This is because if the alkoxy group is directly bonded to the aluminum, the compounds is easily hydrolyzed, and is thus not suited to an emulsifying treatment.

(1)

Here, $R^1$, $R^2$, and $R^3$ are each independently an alkyl group or an alkoxyl group. Examples of the alkyl group include a methyl group and an ethyl group. Examples of the alkoxyl group include a methoxy group, an ethoxy group, and an oleyloxy group.

Specific examples of the aluminum chelating agent represented by the formula (1) include aluminum tris(acetylacetonate), aluminum tris(ethylacetoacetate), aluminum monoacetylacetonate bis(ethylacetoacetate), and aluminum monoacetylacetonate bisoleylacetoacetate.

In addition, if the degree of crosslinking of the polymer obtained by interfacial polymerization of the polyfunctional isocyanate is too small, the latency of the aluminum chelate latent curing agent according to the present invention tends to deteriorate, while if the degree of crosslinking is too large, the thermal responsiveness of the aluminum chelate latent curing agent tends to deteriorate. Therefore, it is preferred to use a porous resin having a degree of crosslinking adjusted on the basis of the intended usage. Here, the degree of crosslinking of the porous resin can be measured by a micro-compression test.

From the perspective of curing stability, it is preferred that the aluminum chelate latent curing agent according to the present invention essentially should not include the organic solvent used during the interfacial polymerization thereof. Specifically, it is preferred that the aluminum chelate latent curing agent include the organic solvent in an amount of 1 ppm or less.

If the amount of the aluminum chelating agent in the aluminum chelate latent curing agent according to the present invention is too low, the curing properties of the epoxy resin to be cured deteriorate. Furthermore, if the amount is too high, latency deteriorates. Therefore, the amount of the aluminum chelating agent is preferably 10 to 500 parts by mass, and more preferably 10 to 200 parts by mass, with respect to 100 parts by mass of the arylsilane compound of the formula (A).

The total of the aluminum chelating agent and the arylsilane compound of the formula (A) is preferably 100 to 1,000 parts by mass, and more preferably 100 to 800 parts by mass, with respect to 100 parts by mass of the polyfunctional isocyanate. This is because if the total is too low, the curing properties of the epoxy resin to be cured deteriorate, and if the total is too high, the latency of the aluminum chelate latent curing agent deteriorates.

The polyfunctional isocyanate compound added to the aluminum chelate latent curing agent according to the present invention preferably contains two or more, and more preferably three, isocyanate groups in one molecule. Preferred examples of such trifunctional isocyanate compounds include a trimethylolpropane (TMP) adduct obtained by reacting 1 mole of TMP with 3 moles of a diisocyanate compound, as represented by the formula (2); an isocyanurate obtained by self-condensation of 3 moles of a diisocyanate compound, as represented by the formula (3); and a biuret obtained by condensation of diisocyanate urea obtained from 2 moles out of 3 moles of a diisocyanate compound, with the remaining 1 mole of the diisocyanate compound, as represented by the formula (4).

In the formulae (2) to (4), substituent R is a moiety composed of a diisocyanate compound from which the isocyanate group was removed. Specific examples of such a diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylenediphenyl-4,4'-diisocyanate.

In the aluminum chelate latent curing agent according to the present invention, it is preferred that the interfacial polymerization of the polyfunctional isocyanate compound be carried out in the presence of a water-soluble epoxy compound. A polyurea-urethane resin wall is formed from the polyfunctional isocyanate compound by the interfacial polymerization, whereby latency is realized. However, a site having low latency (in other words, a site that is not sufficiently covered with the polyurea-urethane resin wall, so that the aluminum chelating agent and the arylsilane compound that can exhibit reactivity with an epoxy group are exposed there) and the epoxy compound react to be polymerized, so that solvent resistance can be improved. Here, "epoxy compound" is a generic term for compounds having an epoxy group, and is a concept including so-called resins, prepolymers, and monomers.

Various types of water-soluble epoxy compound may be used. A preferred example is a glycidyl polyether compound. Specific examples of glycidyl polyether compounds include diethylene glycol diglycidyl ether (Epolite 100E, Kyoeisha Chemical Co., Ltd.), glycerin triglycidyl ether, and glycerin 1,3-diglycidyl ether (EX-313, Nagase ChemteX Corporation).

The water-soluble epoxy compound is a compound that is added to the aqueous phase during the emulsifying treatment. However, if the used amount is too low, the effects of adding it are not exhibited, while if the added amount is too high, the interfacial polymerization rate deteriorates. Therefore, the added amount is preferably 1 to 20 parts by mass, and more preferably 2 to 10 parts by mass, with respect to 100 parts by mass of the water in the aqueous phase.

Next, a method for producing the aluminum chelate latent curing agent according to the present invention will be described.

The method for producing the aluminum chelate latent curing agent according to the present invention is a method including: obtaining an oil phase by dissolving or dispersing an aluminum chelating agent, an arylsilane compound of the formula (A), and a polyfunctional isocyanate compound in an organic solvent; obtaining an emulsion by charging and emulsifying the oil phase into an aqueous phase including a dispersant; and heating the obtained emulsion to cause the polyfunctional isocyanate compound to undergo interfacial polymerization, whereby a polymer is obtained in which the aluminum chelating agent and the arylsilane compound or a hydrolysate thereof are held.

In this production method, first, the aluminum chelating agent, the polyfunctional isocyanate compound, and the arylsilane compound of the formula (A) are dissolved or dispersed in an organic solvent, preferably in a volatile organic solvent, to prepare a solution to serve as the oil phase in the interfacial polymerization. The reason for preferably using a volatile organic solvent is as follows. Other organic solvents with high boiling points of more than 300° C. that are normally used in interfacial polymerization methods do not evaporate during the interfacial polymerization. Consequently, the probability of an isocyanate coming into contact with water does not increase, so that the interfacial polymerization between isocyanate and water does not proceed to a sufficient degree. This makes it difficult to obtain a polymer product with good shape retention properties even by interfacial polymerization. Furthermore, even if such a polymer product is obtained, the high-boiling point solvent remains in the polymer product. When blended into a thermosetting resin composition, the high-boiling point solvent has an adverse impact on the physical properties of the cured product of the thermosetting resin composition. For this reason, it is preferred to use a volatile solvent as the organic solvent in the preparation of the oil phase.

Preferably, the volatile organic solvent can effectively dissolve the aluminum chelating agent and the arylsilane compound of the formula (A) (i.e., respective solubility of preferably 0.1 g/ml (organic solvent) or higher), is substantially incompatible with water (i.e., solubility in water of 0.5 g/ml (organic solvent) or less), and has a boiling point of 100° C. or less at atmospheric pressure. Specific examples of such volatile organic solvents include alcohols, acetates, and ketones. Of these, acetates, and especially ethyl acetate, are preferred because of their high polarity, low boiling point, and poor solubility in water.

If the used amount of the volatile organic solvent with respect to 100 parts by mass of the aluminum chelating agent and the arylsilane compound of formula (A) is too low, the particle size and the curing properties become more varied, while if the used amount is too high, the curing properties deteriorate. Therefore, the used amount of the volatile organic solvent is preferably 10 to 500 parts by mass.

The viscosity of the solution serving as the oil phase can be reduced by using a comparatively large amount of volatile organic solvent within this range. Further, since stirring efficiency improves if the viscosity is reduced, the oil phase droplets during the below-described emulsifying treatment can become finer and more uniform. Consequently, while controlling the average particle size of the obtained curing agent to a size of about 0.1 to 30 μm, a monodisperse particle size distribution can be obtained. It is preferred to set the viscosity of the solution serving as the oil phase to 1 to 100 mPa·s.

The dissolving or dispersing of the aluminum chelating agent and the arylsilane compound of the formula (A) in the organic solvent may be carried out just by mixing and stirring at room temperature under atmospheric pressure. However, optionally, this may also be carried out while heating.

Next, in the production method according to the present invention, the oil phase obtained by dissolving or dispersing the aluminum chelating agent and the arylsilane compound of the formula (A) in an organic solvent is charged into an aqueous phase including a dispersant, and an emulsifying treatment is carried out. Examples of dispersants which can be used include dispersants used in ordinary interfacial polymerization, such as polyvinyl alcohol, carboxymethyl cellulose, gelatin and the like. The used amount of the dispersant is generally 0.1 to 10.0 mass % of the aqueous phase.

If the added amount of the oil phase with respect to the aqueous phase is too low, the particle size distribution becomes more varied, while if the added amount is too high, aggregates of fine particles are formed. Therefore, the added amount of the oil phase is preferably 5 to 70 parts by mass with respect to 100 parts by mass of the aqueous phase.

The emulsifying treatment can be carried out using a known emulsifying apparatus. For example, a Homogenizer T-50, manufactured by IKA Japan K.K. may be used. Examples of the emulsifying conditions include conditions which produce an oil phase size of preferably 0.1 to 30 μm, for example, a stirring speed of 4,000 to 24,000 rpm, under atmosphere pressure, at room temperature to 30° C., and a stirring time of 0.5 to 15 minutes.

Next, the emulsion obtained from the emulsifying treatment is heated and stirred to cause the polyfunctional isocyanate compound to undergo interfacial polymerization. During the interfacial polymerization, the organic solvent may be distilled off.

An example of the interfacial polymerization conditions is stirring (stirring homogenizer, stirring rate of 4,000 rpm or higher) so that the size of the oil phase is preferably 0.1 to 30 μm, and heating and stirring, generally, at atmospheric pressure at 30 to 80° C. for a stirring time of 2 to 12 hours.

The emulsifying treatment and the interfacial polymerization may be carried out as separate processes, or carried out continuously or under the same conditions in a single batch.

An aluminum chelate latent curing agent according to a second aspect of the present invention can be obtained by, after the interfacial polymerization is finished, and then after the organic solvent is optionally removed by a distillation treatment and the like, separating the resulting polymer fine particles by filtration, and then drying the separated particles naturally or under a vacuum. This method allows the curing properties of the aluminum chelate latent curing agent to be controlled by changing the type and used amount of the polyfunctional isocyanate compound, the type and used amount of the aluminum chelating agent, the type and used amount of the arylsilane compound of the formula (A), and the interfacial polymerization conditions. For example, lowering the polymerization temperature enables the curing temperature to be decreased. Conversely, increasing the polymerization temperature enables the curing temperature to be increased.

By adding the aluminum chelate latent curing agent according to the present invention to an epoxy resin, a thermosetting epoxy resin composition having low-temperature fast-curing properties can be provided. Such a thermosetting epoxy resin composition also forms a part of the present invention.

If the amount of the aluminum chelate latent curing agent in the thermosetting epoxy resin composition according to the present invention is too low, curing does not proceed sufficiently, while if the amount is too high, the resin properties (for example, flexibility) of the resultant cured product of that composition deteriorate. Therefore, the amount is 1 to 70 parts by mass, and preferably 1 to 50 parts by mass, with respect to 100 parts by mass of the epoxy resin.

The epoxy resin constituting the thermosetting epoxy resin composition according to the present invention is used as a film-forming component. Not only can an alicyclic epoxy resin be used as such an epoxy resin, but glycidyl ether epoxy resins, which conventionally could not be used in a mixed system of an aluminum chelate latent curing agent and a silane coupling agent, can also be used. Such a glycidyl ether epoxy resin may be a liquid or a solid. Preferably, the glycidyl ether epoxy resin usually has an epoxy equivalent of about 100 to 4,000, and has 2 or more epoxy groups in the molecule. Examples thereof include a bisphenol A epoxy resin, a bisphenol F epoxy resin, a phenol novolac epoxy resin, a cresol novolac epoxy resin, an ester epoxy resin and the like. Of these, it is preferred to use a bisphenol A epoxy resin, due to its resin properties. Furthermore, monomers and oligomers of such examples are also included in these epoxy resins.

In addition to such a glycidyl ether epoxy resin, the thermosetting epoxy resin composition according to the present invention can also use an oxetane compound as a resin component at the same time to obtain a sharper exothermic peak. Preferred oxetane compound examples include 3-ethyl-3-hydroxymethyloxetane, 1,4-bis{[(3-ethyl-3-oxetanyl)methoxy]methyl}benzene, 4,4'-bis[(3-ethyl-3-oxetanyl)methoxymethyl]biphenyl, bis[(3-ethyl-3-oxetanyl)]methyl 1,4-benzenedicarboxylate, 3-ethyl-3-(phenoxymethyl)oxetane, 3-ethyl-3-(2-ethylhexyloxymethyl)-oxetane, di[1-ethyl(3-oxetanyl)]methyl ether, 3-ethyl-3-{[3-(triethoxysilyl)propoxy]methyl}oxetane, oxetanyl silsesquioxane, phenol novolac oxetane and the like. When using an oxetane compound, the amount used is preferably 10 to 100 parts by mass, and more preferably 20 to 70 parts by mass, with respect to 100 parts by mass of the epoxy resin.

The thermosetting epoxy resin composition according to the present invention may optionally further contain a silane coupling agent, a filler such as silica and mica, a pigment, an antistatic agent and the like.

The silane coupling agent, as described in paragraphs 0007 to 0010 of Japanese Patent Application Laid-Open No. 2002-212537, has a function of cooperating with the aluminum chelating agent to initiate cationic polymerization of a thermosetting resin (for example, the thermosetting epoxy resin). Therefore, by simultaneously using a small amount of such a silane coupling agent, the effect of promoting the curing of the epoxy resin can be obtained. The silane coupling agent has 1 to 3 lower alkoxyl groups in the molecule. Further, the silane coupling agent may have a group in the molecule that can react with functional groups on the thermosetting resin, such as a vinyl group, a styryl group, an acryloyloxy group, a methacryloyloxy group, an epoxy group, an amino group, a mercapto group and the like. Further, since the latent curing agent according to the present invention is a cationic curing agent, a coupling agent having an amino group or a mercapto group can also be used if the amino group or mercapto group does not substantially capture the generated cation species.

Specific examples of such a silane coupling agent include vinyltris(β-methoxyethoxy)silane, vinyltriethoxysilane, vinyltrimethoxysilane, γ-styryltrimethoxysilane, γ-methacryloxy-propyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

In the case of simultaneously using a small amount of a silane coupling agent, no effect from adding the silane coupling agent can be expected if the used amount is too small, while if the used amount is too large, the silanolate anions produced from the silane coupling agent can cause a polymerization termination reaction. Therefore, the used amount of the silane coupling agent is 1 to 300 parts by mass, and preferably 1 to 100 parts by mass, with respect to 100 parts by mass of the aluminum chelate latent curing agent.

Since the thus-obtained thermosetting epoxy resin composition according to the present invention can use an aluminum chelate latent curing agent as a curing agent, it has excellent storage stability despite the fact that it is a one-component type. Furthermore, despite the fact that it includes a glycidyl ether epoxy resin, which until now could not be sufficiently cured with an aluminum chelate latent curing agent, the thermosetting epoxy resin composition can be subjected to cationic polymerization by imparting low-temperature fast curing properties to the composition because a specific arylsilane compound having high steric hindrance is included in the aluminum chelate latent curing agent without harming the ability of the catalyst to promote cationic polymerization.

EXAMPLES

The present invention will now be described in more detail.

Reference Example 1

An aqueous phase was prepared by charging 850 parts by mass of distilled water, 0.05 parts by mass of a surfactant (Newrex R, NOF Corporation), and 4 parts by mass of polyvinyl alcohol (PVA-205, Kuraray Co., Ltd.) as a dispersant into a 3-L interfacial polymerization vessel equipped with a thermometer, and uniformly mixing the resultant mixture.

This aqueous phase was charged with an oil phase prepared by dissolving 20 parts by mass of a solution of aluminum monoacetylacetonate bis(ethylacetoacetate) in 24% isopropanol (Alumichelate D, Kawaken Fine Chemicals Co., Ltd.) and 20 parts by mass of triphenylsilanol (TPS, Tokyo Chemical Industry Co., Ltd.) in 70 parts by mass of ethyl acetate. The resultant mixture was emulsified using a homogenizer (10,000 rpm, 5 minutes).

The obtained emulsion was heated for 6 hours at 80° C., and the ethyl acetate was then removed by distillation.

Figure 1:
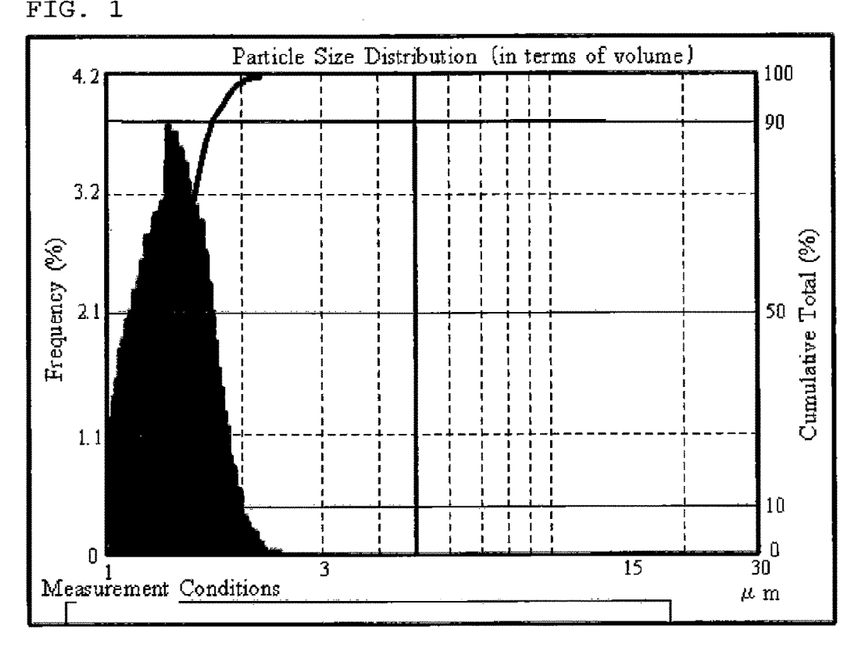
FIG. 1 is a grain size distribution map of the aluminum chelate curing agent of Reference Example 1.

After the heating was finished, the reaction solution was left to cool to room temperature. The curing agent particles were separated by filtration, and then left to dry naturally to obtain fine particles of an aluminum chelate curing agent. The particle size distribution of the obtained aluminum chelate curing agent in terms of volume was measured using a sheath flow electrical resistance particle size distribution measurement apparatus (SD-2000, Sysmex Corporation). The obtained results are shown in FIG. 1. From the results, it can be seen that this aluminum chelate curing agent is a mono-dispersion having particles controlled to a single-digit micron size, with an average particle size of 1.42 μm and a maximum particle size of 2.60 μm.

An epoxy resin composition was prepared by uniformly mixing 80 parts by weight of a bisphenol A epoxy resin (EP828, Japan Epoxy Resin Co., Ltd.) with 20 parts by weight of this aluminum chelate curing agent.

The obtained epoxy resin composition was subjected to thermal analysis (evaluation amount: 5 mg, rate of temperature increase: 10° C./min) using a differential thermal analyzer (DSC) (DSC 6200, Seiko Instruments Inc.). The obtained results are shown in Table 1 and FIG. 2. Here, concerning the curing properties of the aluminum chelate curing agent, "exothermic onset temperature" refers to the temperature at which curing starts, and "exothermic peak temperature" refers to the temperature at which curing is most active. To realize good low-temperature fast-curing properties, it is desired that the actual gross calorific value be 250 J/g or more.

TABLE 1

| Aluminum Chelating Agent (parts by mass) | TPS (parts by mass) | Exothermic Onset Temperature (° C.) | Exothermic Peak Temperature (° C.) | Gross Calorific Value (J/g) |
|---|---|---|---|---|
| 20*[1] | 20*[1] | Simultaneous with measurement start | 84.1 | 324 |

*[1]Parts by mass with respect to 850 parts by mass of distilled water.

Figure 2:
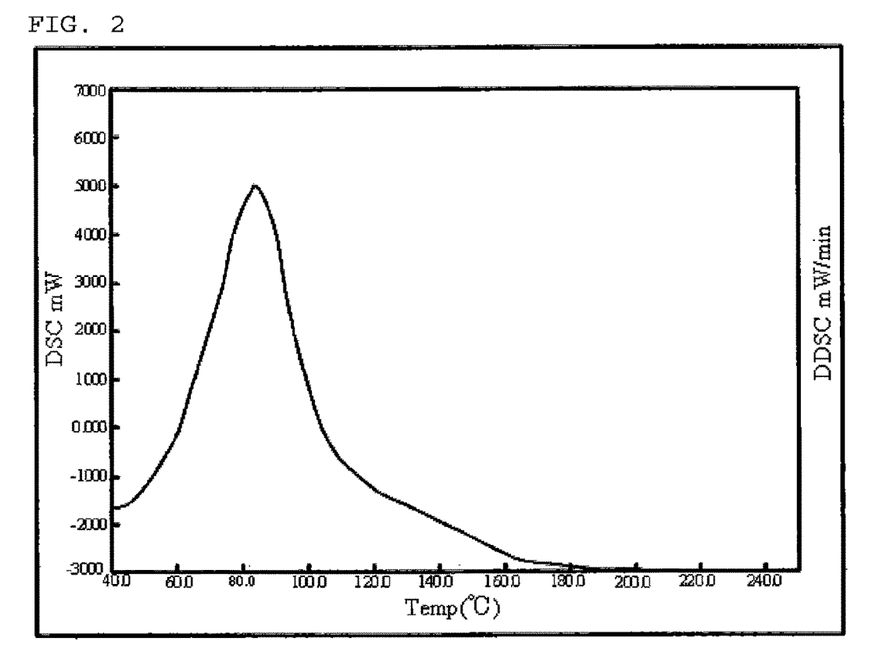
FIG. 2 is a DSC measurement diagram of the thermosetting epoxy resin composition prepared in Reference Example 1.

From the results in Table 1 and FIG. 2, it can be seen that although an aluminum chelating agent that does not have an alkoxy group directly bonded to the aluminum does not exhibit latency, it does not lose its catalytic activity, even if subjected to an emulsifying treatment and a heat treatment in water.

Examples 1 and 2

Production of Aluminum Chelate Latent Curing Agent

An aqueous phase was prepared by charging 850 parts by mass of distilled water, 0.05 parts by mass of a surfactant (Newrex R, NOF Corporation), and 4 parts by mass of polyvinyl alcohol (PVA-205, Kuraray Co., Ltd.) as a dispersant into a 3-L interfacial polymerization vessel equipped with a thermometer, and uniformly mixing the resultant mixture.

This aqueous phase was charged with an oil phase prepared by dissolving the following in 70 parts by mass of ethyl acetate: 20 parts by mass of a solution of aluminum monoacetylacetonate bis(ethylacetoacetate) in 24% isopropanol (Alumichelate D, Kawaken Fine Chemicals Co., Ltd.), 5 parts by mass (Example 1) or 10 parts by mass (Example 2) of the adduct of trimethylolpropane (1 mole) with methylenediphenyl-4,4'-diisocyanate (3 moles) (D-109, Mitsui Chemicals, Inc.), and 20 parts by mass of triphenylsilanol (TPS, Tokyo Chemical Industry Co., Ltd.). The resultant mixture was emulsified and mixed using a homogenizer (10,000 rpm, 5 minutes), and then subjected to interfacial polymerization for 6 hours at 80° C. while distilling off the ethyl acetate.

Figure 3:
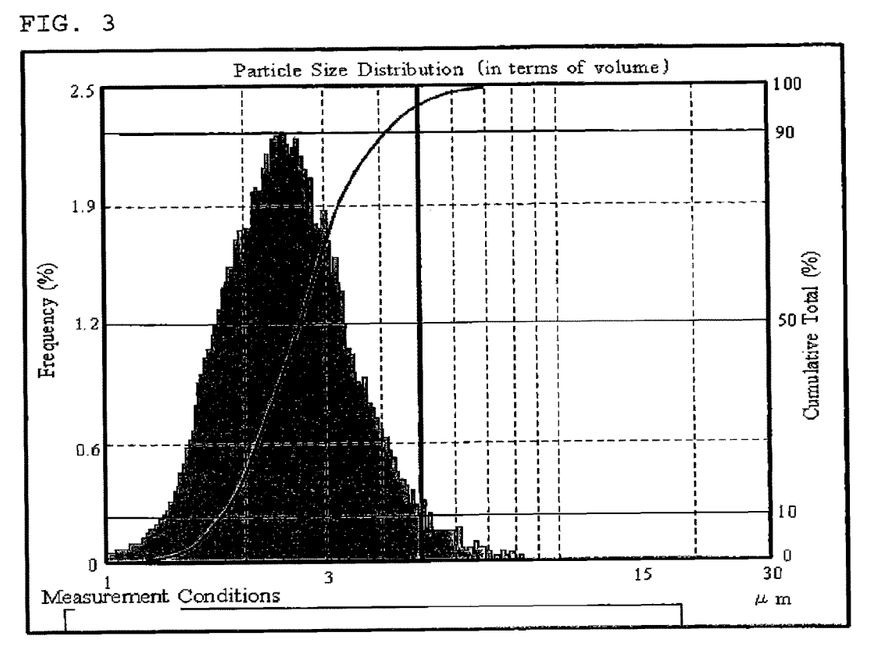
FIG. 3 is a grain size distribution map of the aluminum chelate latent curing agent of Example 2.

After the reaction was finished, the polymerization reaction solution was left to cool to room temperature. The polymer particles were separated by filtration, and then left to dry naturally to obtain fine particles of an aluminum chelate latent curing agent. The particle size distribution of the obtained aluminum chelate latent curing agent of Example 2 in terms of volume was measured using a sheath flow electrical resistance particle size distribution measurement apparatus (SD-2000, Sysmex Corporation). The obtained results are shown in FIG. 3. From the results, it can be seen that this aluminum chelate latent curing agent is a monodispersion having particles controlled to a single-digit micron size, with an average particle size of 2.66 µm and a maximum particle size of 8.57 µm.

Thermosetting epoxy resin compositions were prepared by uniformly mixing 80 parts by weight of a bisphenol A epoxy resin (EP828, Japan Epoxy Resin Co., Ltd.) with 20 parts by weight of the aluminum chelate latent curing agent of Example 1 or 2.

The obtained thermosetting epoxy resin composition was subjected to thermal analysis (evaluation amount: 5 mg, rate of temperature increase: 10° C./min) using a differential thermal analyzer (DSC) (DSC 6200, Seiko Instruments Inc.). The obtained results are shown in Table 2 and FIG. 4. For reference, the results of Reference Example 1 are also shown.

TABLE 2

| Example | Polyfunctional Isocyanate (parts by weight)*[1] | Exothermic Onset Temperature (° C.) | Exothermic Peak Temperature (° C.) | Gross Calorific Value (J/g) |
|---|---|---|---|---|
| Reference Example 1 | — | Simultaneous with measurement start | 84.1 | 324 |
| Example 1 | 5 | 48.5 | 95.8 | 327 |
| Example 2 | 10 | 70.2 | 105.5 | 391 |

*[1]The added amounts of the aluminum chelating agent and the TPS each were 20 parts by mass.

Figure 4:
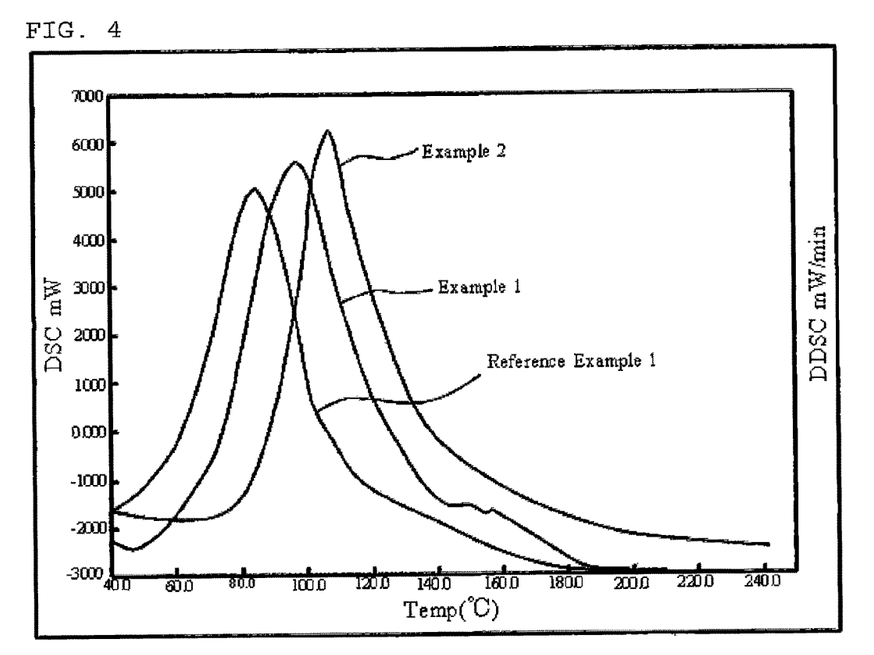
FIG. 4 is a DSC measurement diagram of the thermosetting epoxy resin compositions prepared in Reference Example 1 and Examples 1 and 2.

From the results in Table 2 and FIG. 4, it can be seen that even if 10 parts by mass (equivalent to 25%), which is a very small amount, of a polyfunctional isocyanate compound is added to a total blended amount of aluminum chelating agent and triphenylsilanol of 40 parts by mass, the exothermic onset temperature is about 70° C., and sufficient latency can be realized.

Examples 3 to 4

Production of Aluminum Chelate Latent Curing Agent

An aluminum chelate latent curing agent was obtained in the same manner as in Example 2, except that the added amount of PVA into the aqueous phase was increased from 4 parts by mass to 6 parts by mass (Example 3) or 8 parts by mass (Example 4). A thermosetting epoxy resin composition was then prepared by uniformly mixing 20 parts by weight of the obtained aluminum chelate latent curing agent with 80 parts by weight of a bisphenol A epoxy resin (EP828, Japan Epoxy Resin Co., Ltd.).

Figure 5:
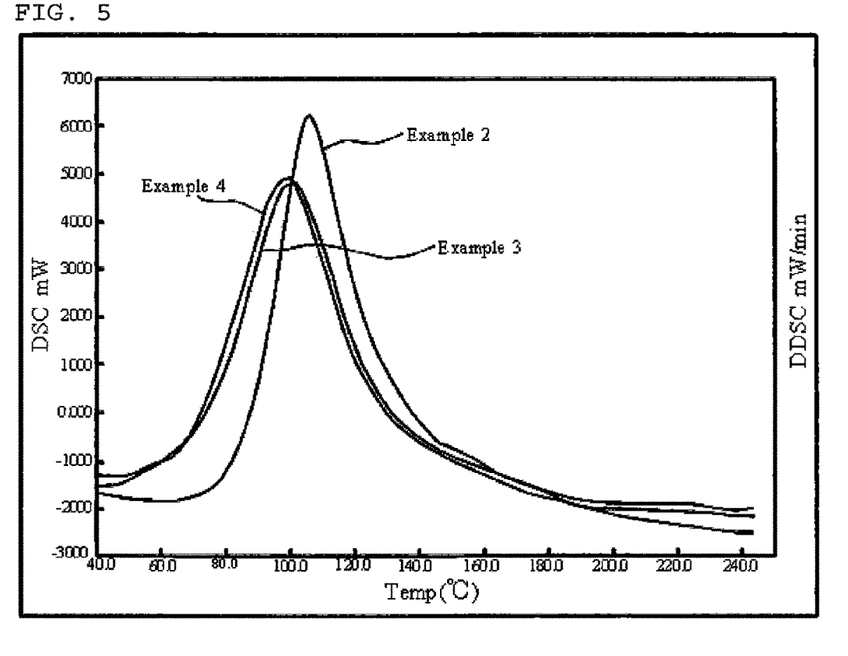
FIG. 5 is a DSC measurement diagram of the thermosetting epoxy resin compositions prepared in Examples 2 to 4.

The obtained thermosetting epoxy resin composition was subjected to thermal analysis (evaluation amount: 5 mg, rate of temperature increase: 10° C./min) using a differential thermal analyzer (DSC) (DSC 6200, Seiko Instruments Inc.). The obtained results are shown in Table 3 and FIG. 5. For reference, the results of Example 2 are also shown.

Figure 6A:
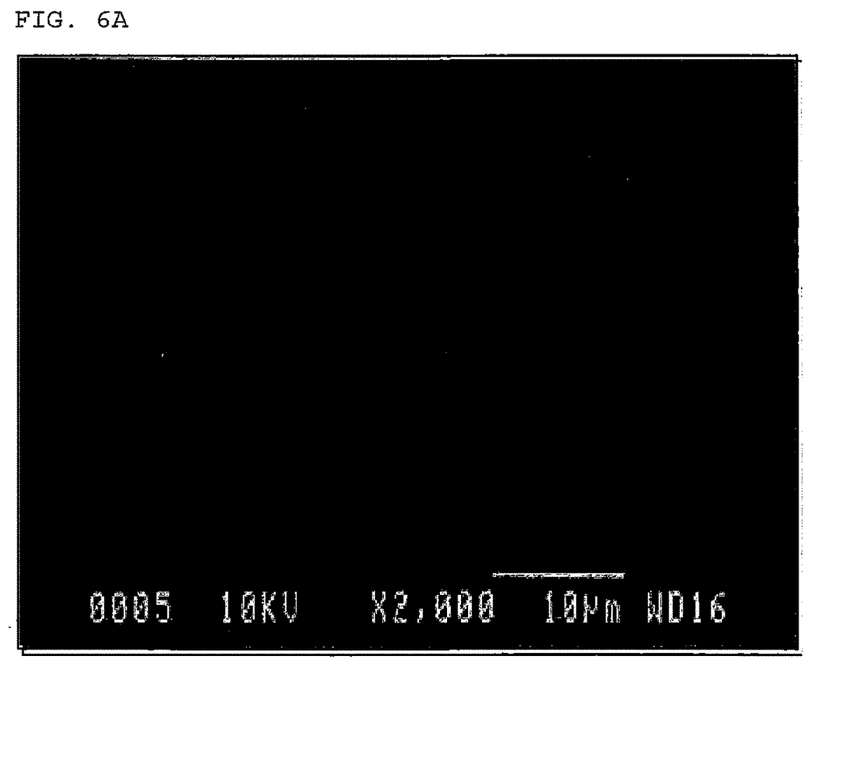
FIG. 6A is an electron micrograph (2,000 times magnification) of the aluminum chelate latent curing agent of Example 2.
Figure 6B:
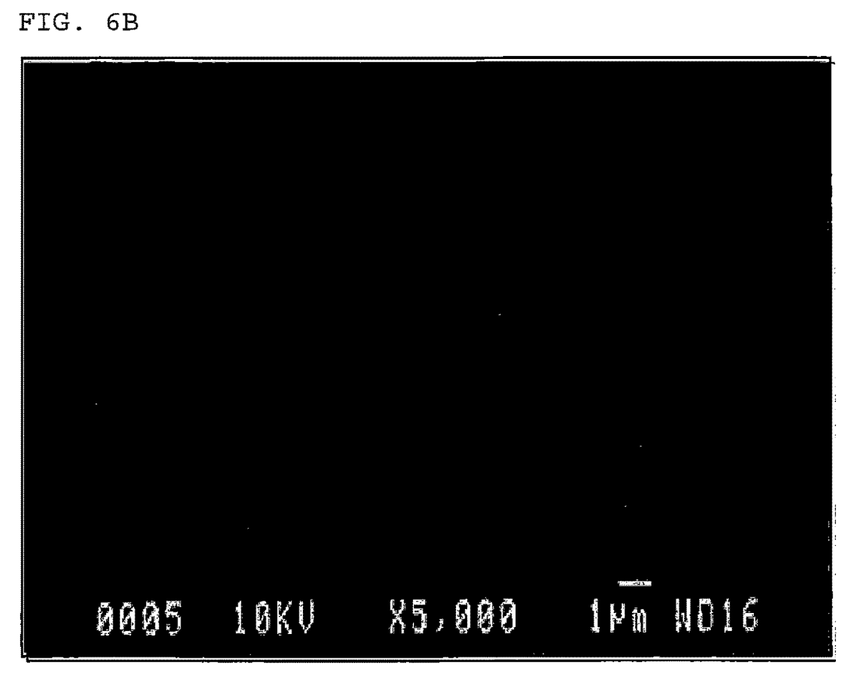
FIG. 6B is an electron micrograph (5,000 times magnification) of the aluminum chelate latent curing agent of Example 2.
Figure 7A:
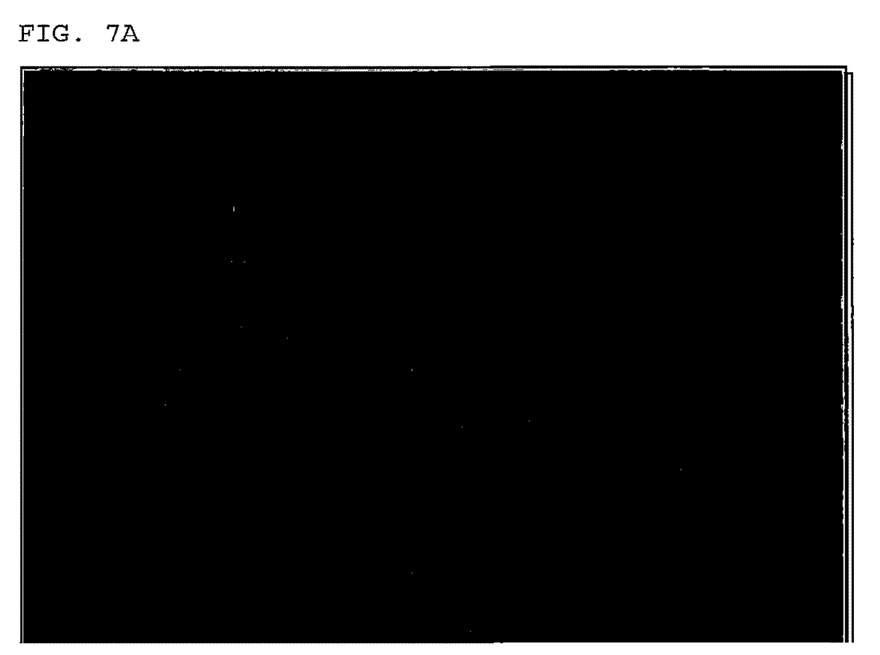
FIG. 7A is an electron micrograph (2,000 times magnification) of the aluminum chelate latent curing agent of Example 3.
Figure 7B:
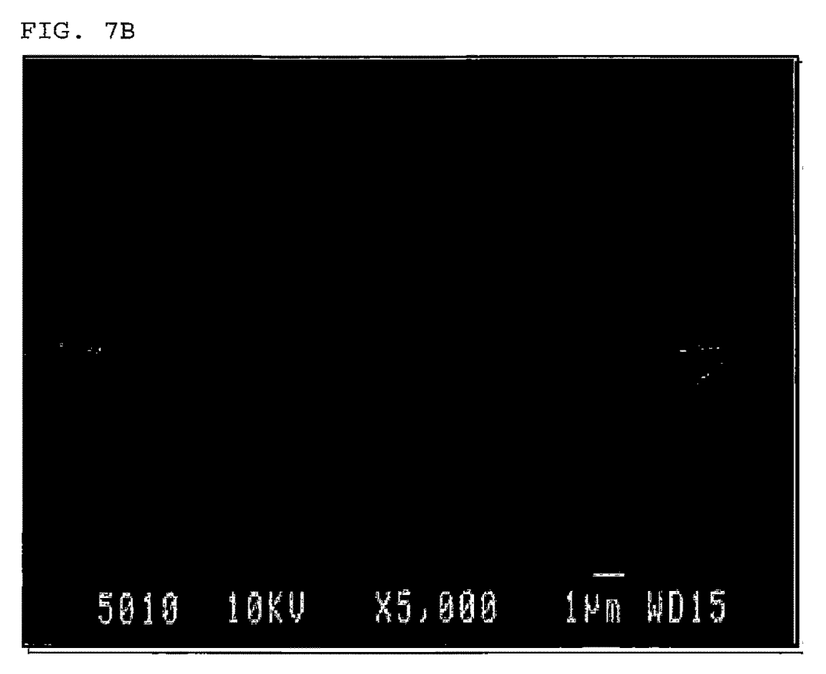
Figure 8A:
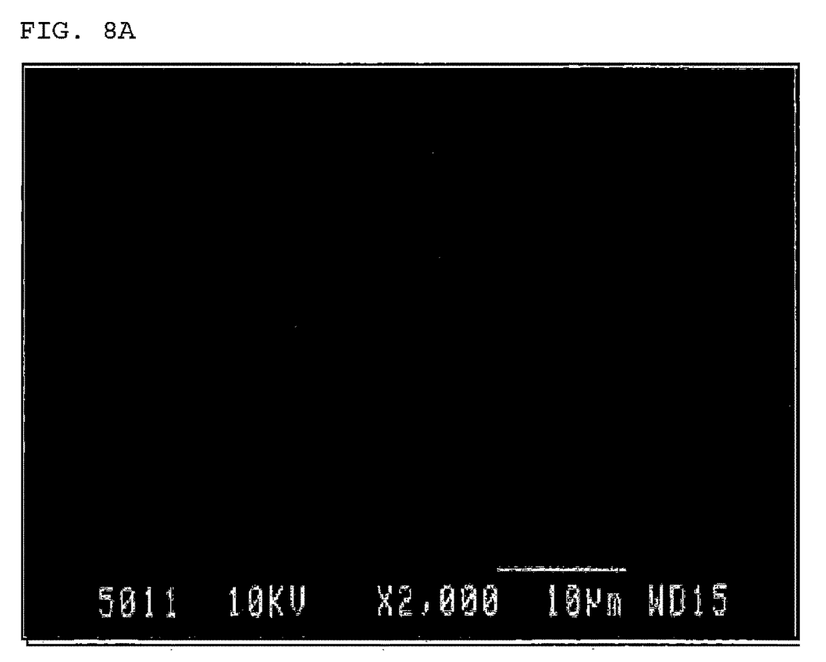
FIG. 8A is an electron micrograph (2,000 times magnification) of the aluminum chelate latent curing agent of Example 4.
Figure 8B:
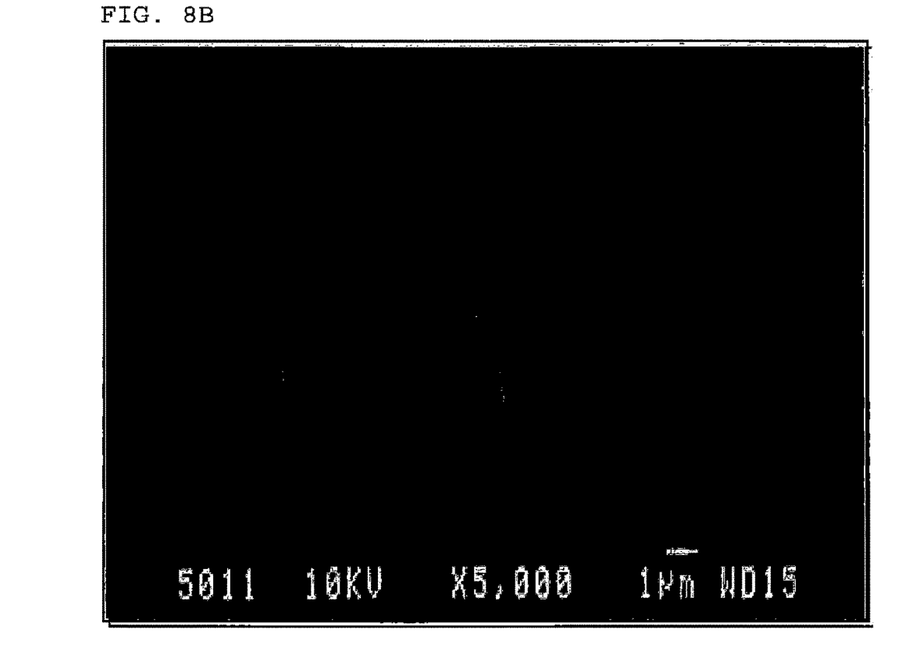
FIG. 8B is an electron micrograph (5,000 times magnification) of the aluminum chelate latent curing agent of Example 4.

Electron micrographs of the aluminum chelate latent curing agent of Example 2 are shown in FIG. 6A (2,000 times magnification) and FIG. 6B (5,000 times magnification). Electron micrographs of the aluminum chelate latent curing agent of Example 3 are shown in FIG. 7A (2,000 times magnification) and FIG. 7B (5,000 times magnification). Electron micrographs of the aluminum chelate latent curing agent of Example 4 are shown in FIG. 8A (2,000 times magnification) and FIG. 8B (5,000 times magnification).

TABLE 3

| Example | PVA (parts by weight) | Exothermic Onset Temperature (° C.) | Exothermic Peak Temperature (° C.) | Gross Calorific Value (J/g) | Particle Shape |
|---|---|---|---|---|---|
| 2 | 4 | 70.2 | 105.5 | 391 | Irregular |
| 3 | 6 | 45.2 | 100.0 | 368 | Spherical |
| 4 | 8 | 44.2 | 98.2 | 365 | Spherical |

From these figures and Table 3, it can be seen that although the particle shape can be changed from an irregular shape to a spherical shape by increasing the added amount of dispersant, latency deteriorated. Therefore, the reason why good latency was conferred to the fine particles of the aluminum chelate curing agent by interfacial polymerization with a small amount of a polyfunctional isocyanate compound is thought to be because the particles had an irregular shape, and thus had a larger surface area than spherical-shaped particles.

<Solvent Resistance Test of the Aluminum Chelate Latent Curing Agent of Example 2>

The aluminum chelate latent curing agent obtained in Example 2 was dipped for 4 hours in ten times the amount of propylene glycol monomethyl ether acetate (PGMEA), then filtered, and dried.

A thermosetting epoxy resin composition was prepared by uniformly mixing 20 parts by weight of this solvent-treated aluminum chelate latent curing agent with 80 parts by weight of a bisphenol A epoxy resin (EP828, Japan Epoxy Resin Co., Ltd.). This thermosetting epoxy resin composition was subjected to thermal analysis (evaluation amount: 5 mg, rate of temperature increase: 10° C./min) using a differential thermal analyzer (DSC) (DSC 6200, Seiko Instruments Inc.). The obtained results are shown in Table 4 and FIG. 9. For reference, the non-solvent-treatment results of Example 2 are also shown.

TABLE 4

| Example 2 | Exothermic Onset Temperature (° C.) | Exothermic Peak Temperature (° C.) | Gross Calorific Value (J/g) |
| --- | --- | --- | --- |
| Solvent Untreated Product | 70.2 | 105.5 | 391 |
| Solvent Treated Product | 67.8 | 107.8 | 343 |

Figure 9:
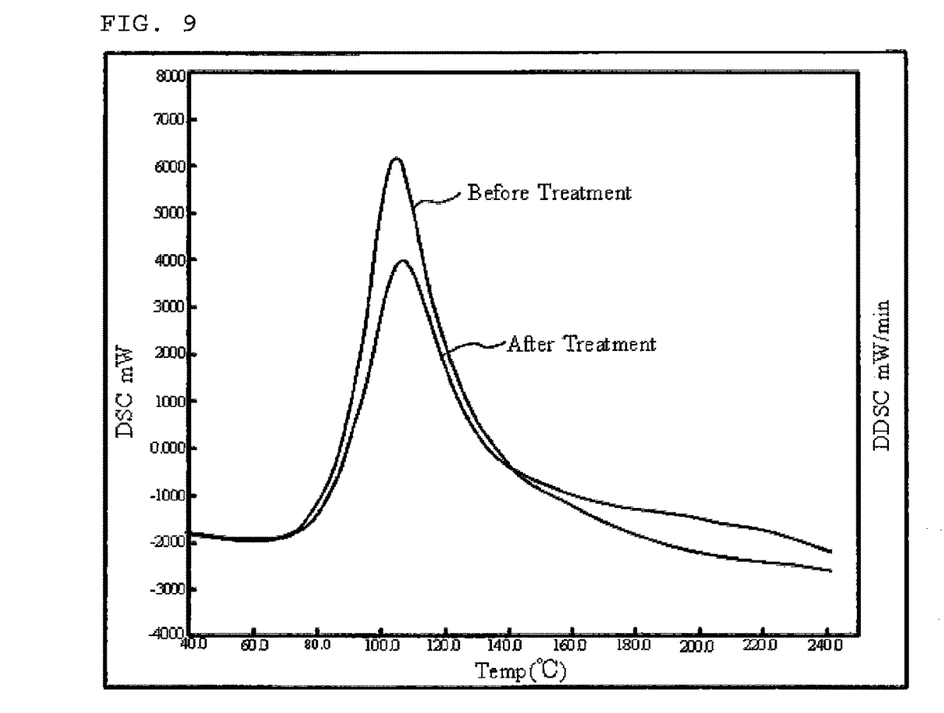
FIG. 9 is a DSC measurement diagram of thermosetting epoxy resin compositions one of which contains the aluminum chelate latent curing agent of Example 2 which had been subjected to a solvent treatment and the other of which contains an aluminum chelate latent curing agent which had not been subjected to a solvent treatment.

From Table 4 and FIG. 9, it can be seen that the gross calorific value of the curing agent decreased by as much as about 50 J/g when the PGMEA-treated aluminum chelate latent curing agent was used. This decrease is thought to be due to elution of the curing component by the polar solvent.

Example 5

An aluminum chelate latent curing agent was prepared by repeating Example 2, except that 10 parts by mass of a trifunctional water-soluble epoxy compound (EX-313, Nagase ChemteX Corporation) was added to the aqueous phase.

This aluminum chelate latent curing agent, whose microcapsule walls were strengthened with the water-soluble epoxy compound, was dipped for 4 hours in ten times the amount of propylene glycol monomethyl ether acetate (PGMEA), then filtered, and dried.

A thermosetting epoxy resin composition was prepared by uniformly mixing 20 parts by weight of this solvent-treated aluminum chelate latent curing agent with 80 parts by weight of a bisphenol A epoxy resin (EP828, Japan Epoxy Resin Co., Ltd.). This thermosetting epoxy resin composition was subjected to thermal analysis (evaluation amount: 5 mg, rate of temperature increase: 10° C./min) using a differential thermal analyzer (DSC) (DSC 6200, Seiko Instruments Inc.). The obtained results are shown in Table 5 and FIG. 10. For reference, the non-solvent-treatment results of Example 5 are also shown.

TABLE 5

| Example 5 | Exothermic Onset Temperature (° C.) | Exothermic Peak Temperature (° C.) | Gross Calorific Value (J/g) |
| --- | --- | --- | --- |
| Solvent Untreated Product | 55.7 | 104.0 | 352 |
| Solvent Treated Product | 67.6 | 113.0 | 311 |

Figure 10:
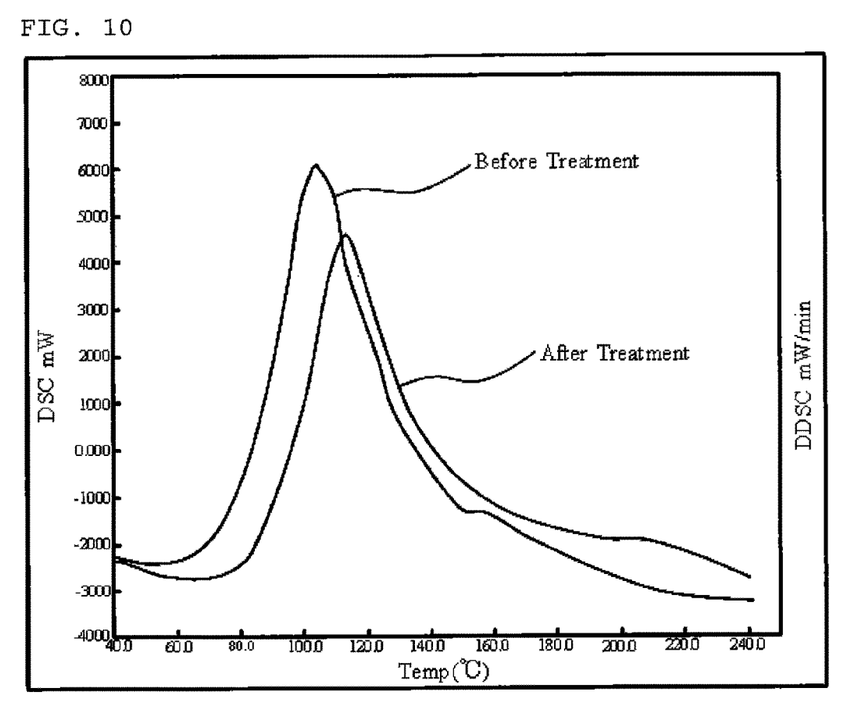
FIG. 10 is a DSC measurement diagram of thermosetting epoxy resin compositions one of which contains the aluminum chelate latent curing agent of Example 5 which had been subjected to a solvent treatment and the other of which contains an aluminum chelate latent curing agent which had not been subjected to a solvent treatment.

From Table 5 and FIG. 10, it can be seen that the decrease in the gross calorific value of the curing agent was reduced to about 40 J/g when the PGMEA-treated aluminum chelate latent curing agent was used.

Example 6

An aluminum chelate latent curing agent was prepared by repeating Example 2, except that 20 parts by mass of the trifunctional water-soluble epoxy compound (EX-313, Nagase ChemteX Corporation) was added to the aqueous phase.

A thermosetting epoxy resin composition was prepared by uniformly mixing 20 parts by weight of an aluminum chelate latent curing agent, which was obtained by treating an aluminum chelate latent curing agent, whose microcapsule walls were strengthened with a water-soluble epoxy compound, with PGMEA in the same manner as Example 5, with 80 parts by weight of a bisphenol A epoxy resin (EP828, Japan Epoxy Resin Co., Ltd.). This thermosetting epoxy resin composition was subjected to thermal analysis (evaluation amount: 5 mg, rate of temperature increase: 10° C./min) using a differential thermal analyzer (DSC) (DSC 6200, Seiko Instruments Inc.). The obtained results are shown in Table 6 and FIG. 11. For reference, the non-solvent-treatment results of Example 6 are also shown.

Figure 12A:
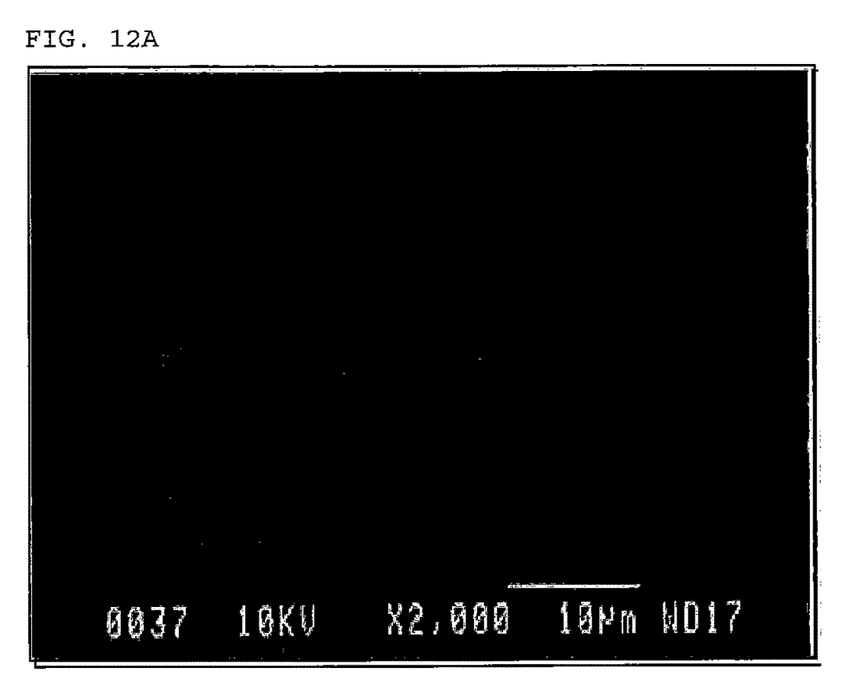
FIG. 12A is an electron micrograph (2,000 times magnification) of the aluminum chelate latent curing agent of Example 6.
Figure 12B:
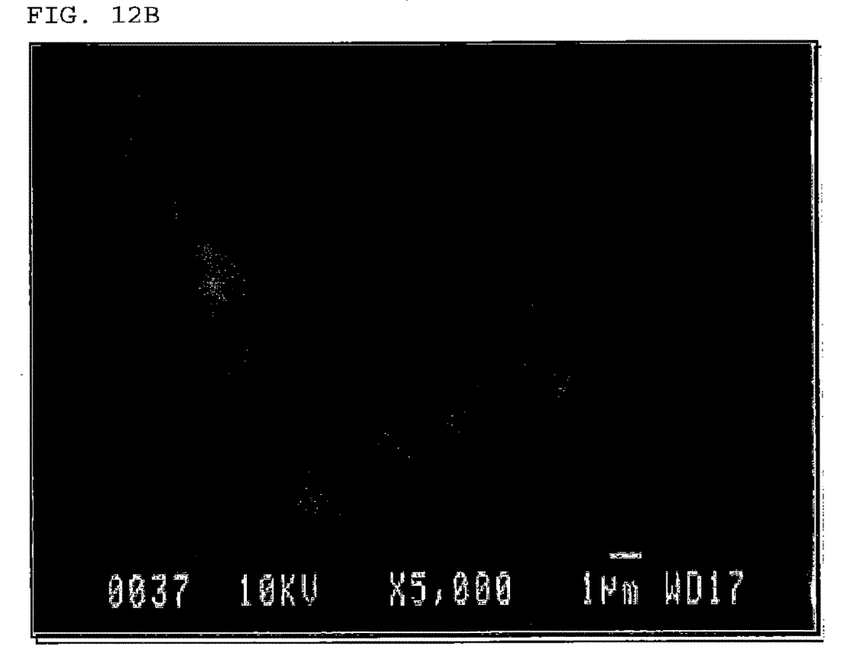
FIG. 12B is an electron micrograph (5,000 times magnification) of the aluminum chelate latent curing agent of Example 6.

Electron micrographs of the solvent-treated aluminum chelate latent curing agent of Example 6 are shown in FIG. 12A (2,000 times magnification) and FIG. 12B (5,000 times magnification).

TABLE 6

| Example 6 | Exothermic Onset Temperature (° C.) | Exothermic Peak Temperature (° C.) | Gross Calorific Value (J/g) |
| --- | --- | --- | --- |
| Solvent Untreated Product | 60.5 | 104.2 | 357 |
| Solvent Treated Product | 62.8 | 111.7 | 355 |

Figure 11:
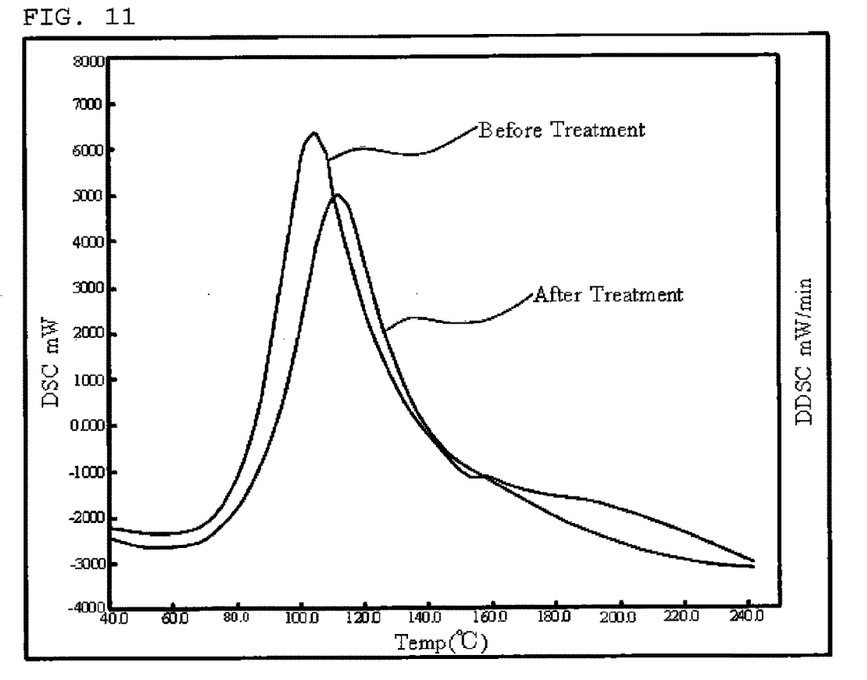
FIG. 11 is a DSC measurement diagram of thermosetting epoxy resin compositions one of which contains the aluminum chelate latent curing agent of Example 6 which had been subjected to a solvent treatment and the other of which contains an aluminum chelate latent curing agent which had not been subjected to a solvent treatment.

From Table 6 and FIG. 11, it can be seen that when an aluminum chelate latent curing agent treated with PGMEA is used, since twice the amount of trifunctional water-soluble epoxy compound was used as in Example 5, there was almost no decrease in the gross calorific value of the curing agent. Furthermore, as can be seen from FIGS. 12A and 12B, the particle shape was irregular even when treated with the solvent.

Example 7

An aluminum chelate latent curing agent was prepared by repeating Example 2, except that 20 parts by mass of a bifunctional water-soluble epoxy compound (Epolite 100E, Kyoeisha Chemical Co., Ltd.) was added to the aqueous phase.

A thermosetting epoxy resin composition was prepared by uniformly mixing 20 parts by weight of an aluminum chelate latent curing agent, which was obtained by treating an aluminum chelate latent curing agent whose microcapsule walls were strengthened with a water-soluble epoxy compound with PGMEA in the same manner as Example 6, with 80 parts by weight of a bisphenol A epoxy resin (EP828, Japan Epoxy Resin Co., Ltd.). This thermosetting epoxy resin composition was subjected to thermal analysis (evaluation amount: 5 mg, rate of temperature increase: 10° C./min) using a differential thermal analyzer (DSC) (DSC 6200, Seiko Instruments Inc.). The obtained results are shown in Table 7 and FIG. 13. For reference, the non-solvent-treatment results of Example 7 are also shown.

TABLE 7

| Example 7 | Exothermic Onset Temperature (° C.) | Exothermic Peak Temperature (° C.) | Gross Calorific Value (J/g) |
|---|---|---|---|
| Solvent Untreated Product | 55.8 | 102.9 | 327 |
| Solvent Treated Product | 65.8 | 109.0 | 318 |

Figure 13:
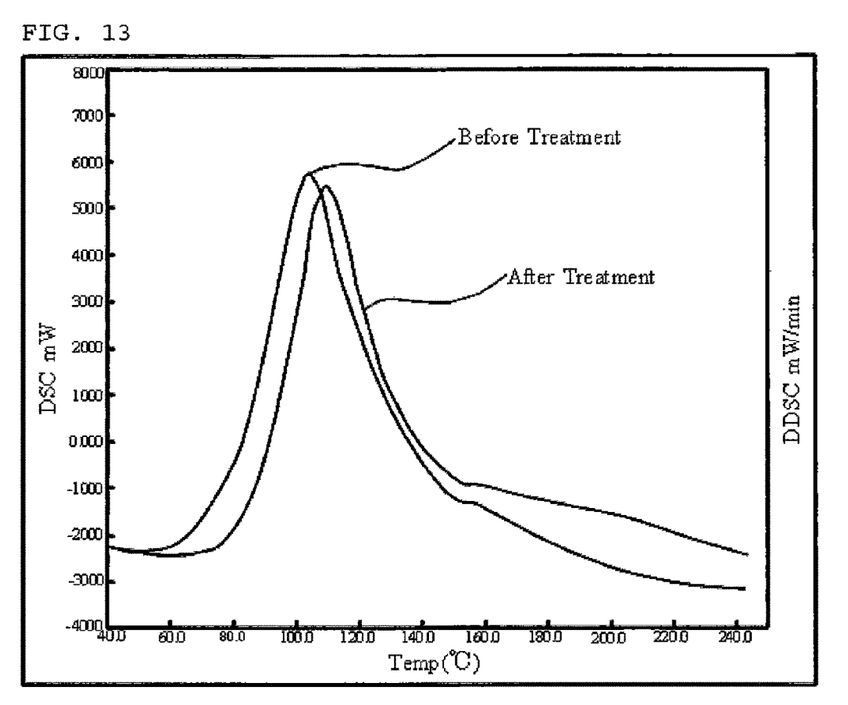
FIG. 13 is a DSC measurement diagram of thermosetting epoxy resin compositions one of which contains the aluminum chelate latent curing agent of Example 7 which had been subjected to a solvent treatment and the other of which contains an aluminum chelate latent curing agent which had not been subjected to a solvent treatment.

From Table 7 and FIG. 13, it can be seen that when an aluminum chelate latent curing agent treated with PGMEA is used, since a bifunctional, not a trifunctional, water-soluble epoxy compound was used, although the exothermic peak temperature is shifted slightly to the higher temperature side, there was almost no decrease in the gross calorific value of the curing agent. Therefore, it can be seen that forming an epoxy polymer layer on the surface of the curing agent particles is effective in improving the solvent resistance of the curing agent.

INDUSTRIAL APPLICABILITY

In the present invention, an aluminum chelating agent and an arylsilane compound are formed into fine particles having a uniform size. Consequently, an aluminum chelate latent curing agent in the form of fine particles that exhibit latency exhibits good low-temperature fast-curing properties. Therefore, this aluminum chelate latent curing agent is useful as a latent curing agent for an epoxy adhesive used in low-temperature, fast connection.

The invention claimed is:

1. An aluminum chelate latent curing agent in which an aluminum chelating agent and an arylsilane compound or a hydrolysate thereof are held in a polymer obtained by:
    subjecting the aluminum chelating agent, the arylsilane compound, and a polyfunctional isocyanate compound to an emulsifying treatment, and then
    subjecting the polyfunctional isocyanate to interfacial polymerization in the presence of a water-soluble epoxy compound,
    wherein:
    the aluminum chelating agent does not have an alkoxy group bonded to the aluminum, and
    the arylsilane compound is represented by the formula (A), (Ar)mSi(OR)n    (A)

where, in the formula (A),
    m is 2 or 3,
    the sum of m and n is 4,
    Ar represents an optionally-substituted aryl group,
    R represents a hydrogen atom, a methyl group, or an ethyl group, and
    when n is 2, the two Rs may be the same or different.

2. The aluminum chelate latent curing agent according to claim 1, whose an average particle size is 0.1 to 30 μm.

3. The aluminum chelate latent curing agent according to claim 1, wherein the Ar is an optionally-substituted phenyl group.

4. The aluminum chelate latent curing agent according to claim 1, wherein the arylsilane compound is any of triphenylsilanol and diphenylsilanediol.

5. The aluminum chelate latent curing agent according to claim 1, wherein the hydrolysate is a hydrolysate of any of triphenylmethoxysilane and triphenylethoxysilane.

6. The aluminum chelate latent curing agent according to claim 1, wherein an amount of the aluminum chelating agent is 10 to 500 parts by mass with respect to 100 parts by mass of the arylsilane compound.

7. The aluminum chelate latent curing agent according to claim 1, wherein a total of the aluminum chelating agent and the arylsilane compound is 100 to 1,000 parts by mass with respect to 100 parts by mass of the polyfunctional isocyanate compound.

8. A method for producing the aluminum chelate latent curing agent according to claim 1, wherein the method comprises:
    obtaining an oil phase by dissolving or dispersing an aluminum chelating agent that does not have an alkoxy group bonded to the aluminum, an arylsilane compound of the formula (A), and a polyfunctional isocyanate compound in an organic solvent;
    obtaining an emulsion by charging and emulsifying the oil phase into an aqueous phase including a dispersant; and
    heating the obtained emulsion to cause the polyfunctional isocyanate compound to undergo interfacial polymerization, whereby a polymer is obtained in which the aluminum chelating agent and the arylsilane compound or a hydrolysate thereof are held, (Ar)mSi(OR)n    (A)

where, in the formula (A),
    m is 2 or 3,
    the sum of m and n is 4,
    Ar represents an optionally-substituted aryl group,
    R represents a hydrogen atom, a methyl group, or an ethyl group, and
    when n is 2, the two Rs may be the same or different.

9. The production method according to claim 8, wherein the aqueous phase further includes a water-soluble epoxy compound.

10. A thermosetting epoxy resin composition, comprising the aluminum chelate latent curing agent according to claim 1, and an epoxy resin.

11. The thermosetting epoxy resin composition according to claim 10, wherein the epoxy resin is a glycidyl ether epoxy resin.

12. The thermosetting epoxy resin composition according to claim 10, further comprising an oxetane compound.

* * * * *